(12) United States Patent
Kawahara

(10) Patent No.: US 6,247,319 B1
(45) Date of Patent: Jun. 19, 2001

(54) STRUCTURE AND METHOD FOR INSTALLATION OF OVERHEAD-TYPE AIR CONDITIONING UNIT FOR VEHICLE

(75) Inventor: Tatsuhide Kawahara, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/550,805

(22) Filed: Apr. 18, 2000

(30) Foreign Application Priority Data

Apr. 23, 1999 (JP) .................................................. 11-117233

(51) Int. Cl.⁷ ..................................................... B60H 1/32
(52) U.S. Cl. ................................. 62/77; 62/244; 62/298; 403/12
(58) Field of Search ................................. 62/77, 239, 244, 62/259.1, 298; 403/12, 13, 231, 403, 408.1

(56) References Cited

U.S. PATENT DOCUMENTS

| | | | |
|---|---|---|---|
| 3,918,270 | * 11/1975 | Dixon et al. | 62/239 |
| 4,478,052 | * 10/1984 | McDowell | 62/244 |
| 4,979,559 | * 12/1990 | Dennis et al. | 62/259.1 |
| 5,127,238 | * 7/1992 | Ichikawa et al. | 62/244 |
| 5,860,288 | * 1/1999 | Morimoto et al. | 62/244 |
| 6,071,070 | * 6/2000 | Yamamoto et al. | 62/244 |

FOREIGN PATENT DOCUMENTS

| | | |
|---|---|---|
| 1-168516 | 7/1989 | (JP) . |
| 1-257616 | 10/1989 | (JP) . |

* cited by examiner

Primary Examiner—William E. Tapolcai
(74) Attorney, Agent, or Firm—Oblon, Spivak, McClelland, Maier & Neustadt, P.C.

(57) ABSTRACT

The present invention relates an installation structure of the rear air conditioning unit 1, and comprises: a left bracket 20 having a body fastening portion 21, an air conditioning unit fastening portion 23 into which bolt holes 22 are bored, and a temporary fastening portion 25 into which a connecting hole 24 is bored and located at the lower side of the air conditioning unit fastening portion via a predetermined space, in one body, and installed beforehand in a body constructing member 7; a left installation member 40 having a bracket fastening portion 42 into which bolt holes 41 are bored and a connecting hook 43 which is downwardly provided at the point of the bracket fastening portion, and fastened on the side portion of the air conditioning unit. The connecting hook is inserted into the connecting hole for temporary fastening, and after that, the bracket fastening portion is fastend to the air conditioning unit fastening portion by bolts 26.

10 Claims, 7 Drawing Sheets

STRUCTURE AND METHOD FOR INSTALLATION OF OVERHEAD-TYPE AIR CONDITIONING UNIT FOR VEHICLE

BACKGROUND OF THE INVENTION

1. Field of the Invention

The present invention relates to a structure and method for installation of an overhead-type air conditioning unit for a vehicle, and especially relates to the art to improve the comfort of a passenger component and to improve the operability of the installation.

This application is based on Japanese Patent Application No. Hei 11-117233, the content of which is incorporated herein by reference.

2. Description of the Related Art

Conventionally, in a vehicle such as what is termed a one-box car or a limousine, there is a case that an air conditioning unit exclusively used for the rear seats, which consists of a second line or second and third lines of seats of the vehicle, is installed. This air conditioning unit is mainly mounted on the ceiling of the passenger compartment as shown in FIGS. 4 and 5, and is generally called an overhead-type air conditioning unit.

The conventional overhead-type air conditioning unit is briefly explained as follows with FIGS. 4 and 5.

FIG. 4 shows an example of the overhead-type air conditioning unit (hereafter, called "a rear air conditioning unit") which is installed in the one-box car. Reference number 1 in these figures denotes the rear air conditioning unit, reference number 2 denotes a front air conditioning unit, reference number 3 denotes a compressor, reference number 4 denotes a condenser, and reference number 5 denotes a side condenser. In this unit, compressed coolant which is compressed by the compressor 3 and has high temperature and high pressure, is cooled by the condenser 4 and side condenser 5, and is supplied to the rear air conditioning unit 1 and the front air conditioning unit 2.

FIG. 5 shows the rear air conditioning unit 1 mounted on the ceiling of the passenger compartment and is shown from the rear side of the passenger compartment. The rear air conditioning unit 1 is fastened on a body constructing member 7 by brackets 6 at both ends. In practice, for preventing the exposure of the installing members such as the brackets 6, a treatment such as covering these members with appropriate covering members 8 are performed as shown in FIG. 6. Furthermore, in FIG. 6, reference number 9 denote drain hoses and reference number 10 denote coolant pipes.

In the above-mentioned rear air conditioning unit 1, the installing structure is required to secure as much headroom as possible because the unit is mounted on the ceiling of the passenger compartment. Therefore, as shown in FIGS. 7 and 8, improvements such as installing the unit between two reinforcement members 12 which project towards the inner side of a roof panel 11 and extend along the width direction, are usually carried out to set the unit at the highest position as possible.

However, the installation operation of the oblong rear air conditioning unit must be performed in a restricted space in the passenger compartment, and installation of the unit by oneself is not easy. Therefore, in the conventional installation method, the rear air conditioning unit is lifted between the reinforcement members 12 by two persons and fastened by bolting or the like.

Meanwhile, to perform the installation operation easily by oneself, an installation method in which mounting the unit on the brackets fastened to both ends of the body, and sliding the mounted unit to the front or rear sides, is conceivable. However, in practice, the sliding operation is prevented by the interference between the unit and the reinforcement mers 12. Therefore, the unit cannot be placed between the reinforcement members 12, and there is a problem that the amount of the unit projecting from the ceiling is increased.

The present invention is provided in compliance with the above circumstances, and the purpose of the present invention is to provide the structure and method to improve the comfortability of the passenger compartment by raising the installation position of the overhead-type rear air conditioning unit, and to improve the operability of the installation.

SUMMARY OF THE INVENTION

The present invention discloses the following means being provided to solve the above-disclosed problems.

That is, the present invention relates the installation structure of an overhead-type air conditioning unit for a vehicle which is installed in a ceiling portion of a passenger compartment, and characterized in that the installation structure comprises: a bracket having a body fastening portion, an air conditioning unit fastening portion into which bolt holes are bored, and a temporary fastening portion into which a connecting hole is bored and located at the lower side of the air conditioning unit fastening portion via a predetermined space, in one body, and installed beforehand in a body constructing member; and an installation member having a bracket fastening portion into which bolt holes are bored and a connecting hook which is downwardly provided at the point of the bracket fastening portion, and fastened on the side portion of the air conditioning unit; wherein, the connecting hook is inserted into the connecting hole for temporary fastening, and after that, the bracket fastening portion is fastened the air conditioning unit fastening portion by bolting.

In this installation structure, the temporary fastening of the air conditioning unit is easily performed by insertion of the connecting hook to the connecting hole, and an operability of the installation is improved.

The installation structure of the overhead-type air conditioning unit for the vehicle of the present invention also characterized in that the installation structure comprises: a first bracket having a body fastening portion, an air conditioning unit fastening portion into which bolt holes are bored, and a temporary fastening portion into which a connecting hole is bored and located at the lower side of said air conditioning unit fastening portion via a predetermined space, in one body, and installed beforehand in one of the body constructing members which are located on the right and left; a first installation member having a bracket fastening portion into which bolt holes are bored and a connecting hook which is downwardly provided at the point of the bracket fastening portion, and fastened on one side portion of the air conditioning unit; a second bracket having a body fastening portion and an air conditioning unit fastening portion into which bolt holes and a temporary fastening hole are bored, and installed beforehand in the other of the body constructing members; and a second installation member having a bracket fastening portion into which bolt holes are bored and an elastic temporary fastening member is upwardly projected, and fastened on the other side portion of the air conditioning unit; wherein, the connecting hook is inserted into the connecting hole for temporary fastening at one side, and after that, the elastic temporary fastening member is forcibly inserted into the temporary fastening hole for temporary fastening, and furthermore, both of the bracket fastening portions are fastened to both of the air conditioning unit fastening portions by bolting.

In this case, it is preferable that the size of the connecting hole is determined to permit the movement of the connecting hook in the connecting hole along the longitudinal and width directions of the connecting hole.

Furthermore, it is preferable that two oval holes extend along the width direction of the vehicle are bored to serve as the bolt holes at the front and rear sides of the connecting hook of the first installation member.

In addition, it is preferable that the elastic temporary fastening member is a resin clip.

In this installation structure, since the temporary fastening at both sides of the air conditioning unit can be performed by an easy operation, the operator can entirely free both his hands from the air conditioning unit so as to begin the bolting.

The present invention also relates the installation method of the overhead-type air conditioning unit for a vehicle which is installed in the ceiling portion of the passenger compartment, and characterized in that the installation method comprises: a first step installing a first bracket having a body fastening portion, an air conditioning unit fastening portion into which bolt holes are bored, and a temporary fastening portion into which a connecting hole is bored and located at the lower side of the air conditioning unit fastening portion via a predetermined space, in one body, and a second bracket having a body fastening portion and an air conditioning unit fastening portion into which bolt holes and a temporary fastening hole are bored, in body constructing members which are located on the right and left respectively; a second step inserting a connecting hook downwardly provided at the point of a bracket fastening portion into which bolt holes are bored and formed at a first installation member fastened on one side portion of the air conditioning unit, into the connecting hole of the first bracket for temporary fastening; a third step forcibly inserting an elastic temporary fastening member upwardly projected from a bracket fastening portion into which bolt holes are bored and formed at a second installation member fastened on the other side portion of the air conditioning unit, into the temporary fastening hole of the second bracket for temporary fastening; and a fourth step fastening the bracket fastening portions of the first and second installation fixer toward the air conditioning unit fastening portions of the first and second brackets by bolting.

In this installation method, the operator can perform the temporary fastening by oneself, and can use his hands freely for bolting.

DESCRIPTION OF THE PREFERRED EMBODIMENTS

Preferred embodiments of the overhead-type air conditioning unit for a vehicle according to the present invention will be presented in the following with reference to the Figures.

Figure 1:
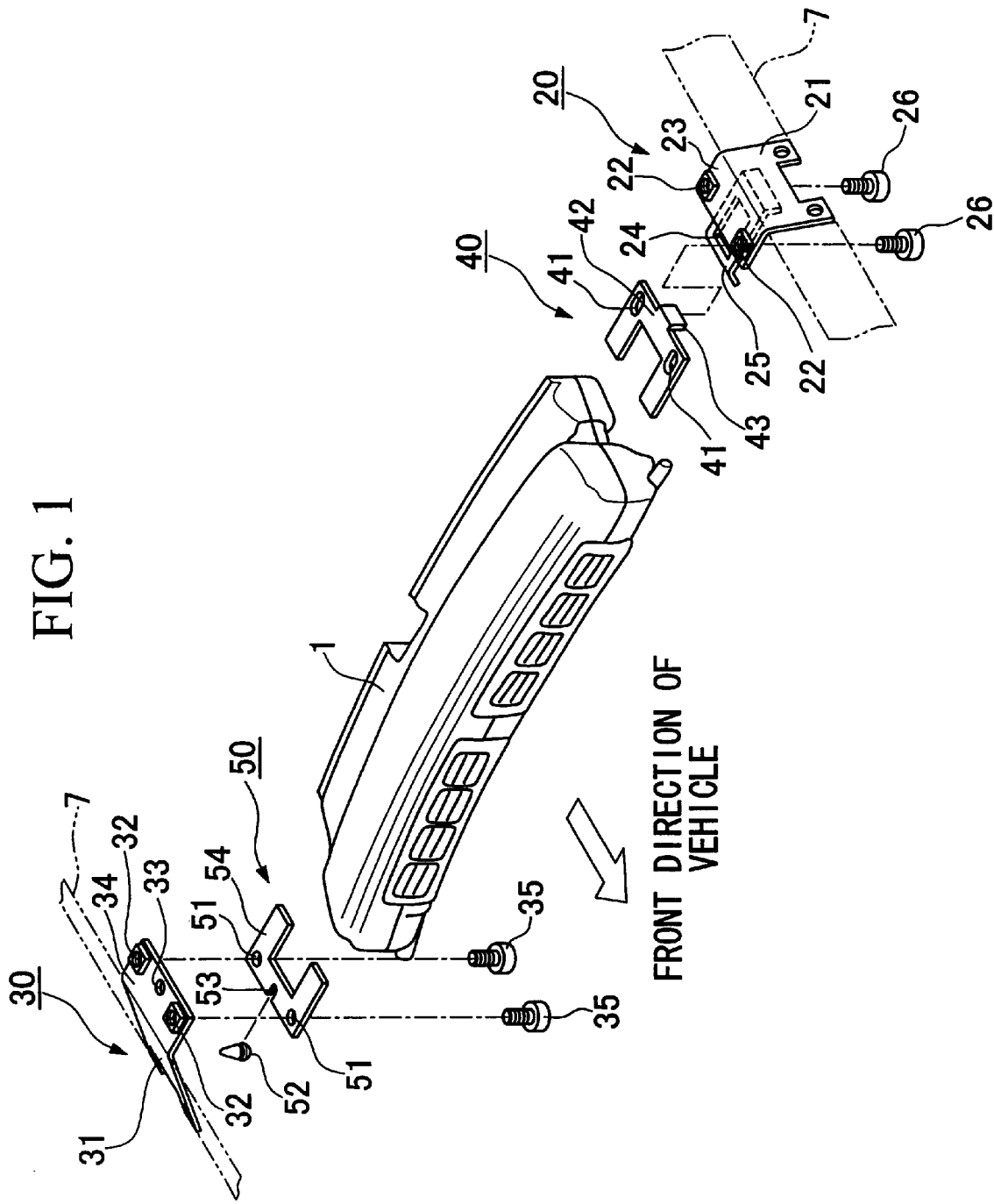
FIG. 1 is an exploded upper perspective drawing which shows an example of the installation structure of the overhead-type air conditioning unit for a vehicle of the present invention.
Figure 2:
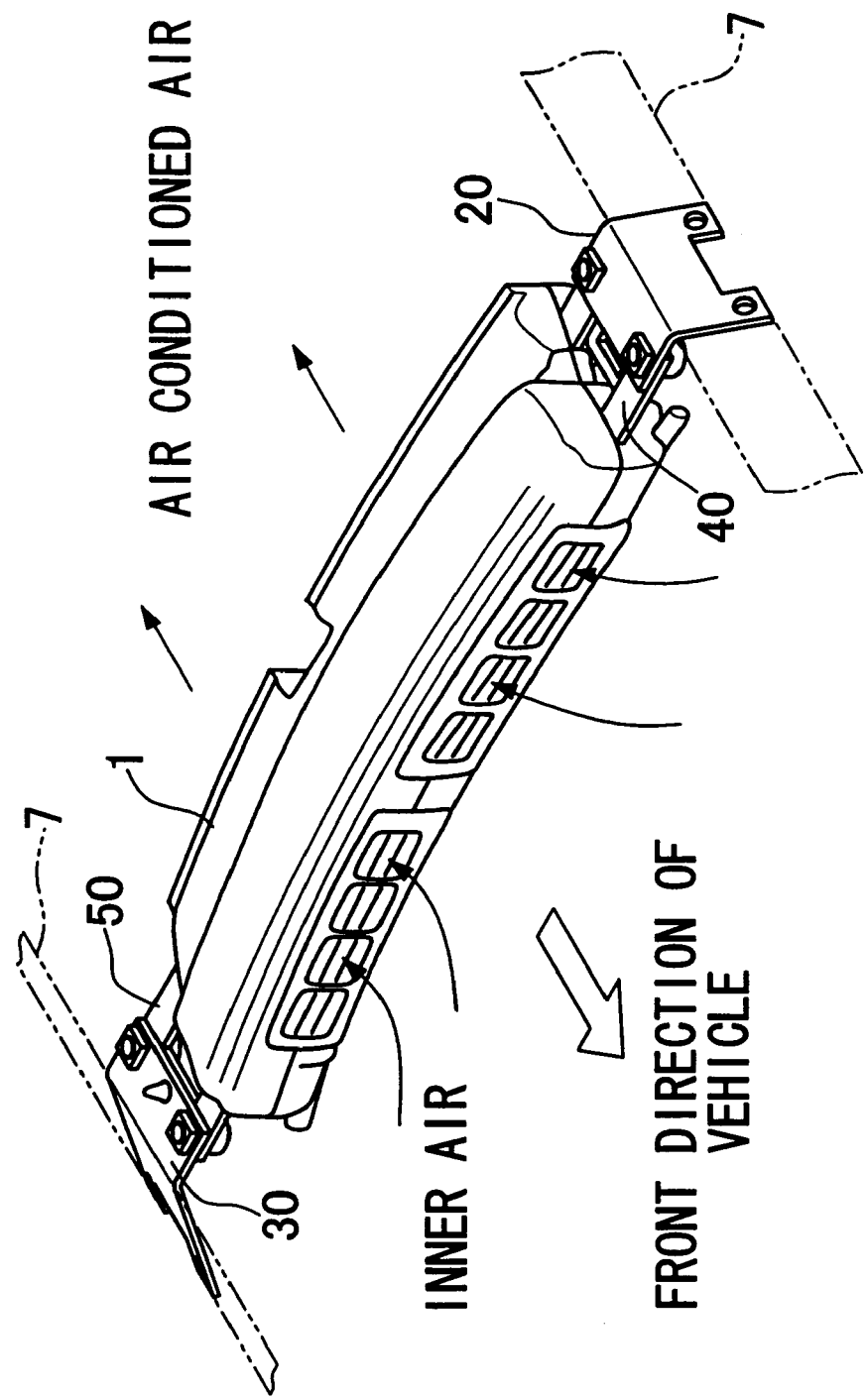
FIG. 2 is an upper perspective drawing which shows an example of the installation structure of the overhead-type air conditioning unit for a vehicle of the present invention when the installation is finished.

In FIGS. 1 and 2, reference number 1 denotes an overhead-type air conditioning unit (hereafter, called "a rear air conditioning unit"), reference numbers 7 denote body constructing members, reference number 20 denotes a left bracket which is provided as a first bracket, reference number 30 denotes a right bracket which is provided as a second bracket, reference number 40 denotes a left installation member which is provided as a first installation member, and reference number 50 denotes a right installation member which is provided as a second installation member, Here, the terms left and right in the present invention indicate the left side and right side along the width direction of the vehicle when facing the front direction of the vehicle. In other words, in the present invention, the left and right are based on the forward direction of the vehicle.

Furthermore, an evaporator and a blower fan are commonly cited as the main components internally installed in the rear air conditioning unit 1. The rear air conditioning unit has the function of in-taking the air of the passenger content (inner air) by the blower fan, heat-exchanging the air with the coolant that flows into the evaporator for heat-exchange, and blowing the heat-exchanged air to the passenger cogent.

As shown in FIG. 1, the left bracket 20 is constructed in a body from a body fastening portion 21 which is fastened the body constructing member 7 by bolting and the like, an air conditioning unit fastening portion 23 into which bolt holes 22 are bored, and a temporary fastening portion 25 into which a connecting hole 24 for insertion of an aftermentioned connecting hook 43 is bored. The body fastening portion 21 and the air conditioning unit fastening portion 23 are formed by bending a plate respectively, and in the lower side of the air conditioning unit fastening portion 23, the plate shaped temporary fastening portion 25 is arranged parallel to the air conditioning unit fastening portion 23 via a predetermined space along the vertical direction. Furthermore, the temporary fastening portion 25 is bonded with the body fastening portion 21 in the neighborhood of its left end by welding and the like.

In addition, the connecting hole 24 of the temporary fastening portion 25 is formed as a rectangular shape and the size of the connecting hole 24 is determined so as to permit the movement of the connecting hook 43 in the connecting hole 24 along the longitudinal and width directions of the connecting hole 24. In other words, the width (the size along the front and rear directions of the vehicle) of the connecting hole 24 is wider than that of the connecting hook 43 and the length (the size along the width direction of the vehicle) of the connecting hole 24 is fully larger than the thickness of the connecting hook 43.

The left bracket 20 constructed as disclosed above is beforehand installed the body constructing member 7 which is located at the left side.

The right bracket 30 has a body fastening portion 31 which is fastened the body constructing member 7 by bolting and the like, bolt holes 32 to fasten the rear air conditioning unit, and an air conditioning unit fastening portion 34 has a temporary fastening hole 33 for insertion of an elastic temporary fastening member described below, that is, a resin clip 52. Since the temporary fastening hole 33 is for holding the inserted resin clip 52, the diameter of the temporary fastening hole 33 must be smaller than that of the large diameter portion of the resin clip 52.

The right bracket 30 constructed as disclosed above is installed beforehand in the body constructing member 7 which is located at the right side.

The left installation member 40 has a bracket fastening portion 42 into which bolt holes 41 that conform to the position of the bolt holes 22 of the left bracket 20 for insertion of bolts 26 are bored, and the connecting hook 43. The connecting hook 43 is formed at the pointed end of the side of the bracket fastening portion 42, that is, the connecting hook 43 is formed at the pointed end of the outer side along the width direction of the vehicle, and projects downwardly. This connecting hook 43 is formed by bending a part of the plate member which forms the bracket fastening portion 42.

The bolt holes 41 are bored 2 places along the front and rear directions of the vehicle to be placed across the connecting hook 43. Furthermore, the bolt holes 41 are oval shaped extending along the width direction of the vehicle to offset a dimensional error.

The left installation member 40 constructed as disclosed above may be installed beforehand in the body so as to project from the left side surface of the rear air conditioning unit, or may be installed afterward at an appropriate place on the left side surface of the rear air conditioning unit by bolting and the like.

The right installation member 50 has bolt holes 51 bored conforming to the position of the bolt holes 32 of the right bracket 30 for insertion of bolts 35. This right installation member 50 has a plate shape and has a bracket fastening portion 54 as its main part, and the bracket fastening portion 54 has a clip installation groove 53 for installation of the elastic clip 52 so as to project upwardly. Therefore, the right installation member 50 functions as the elastic temporary fastening member.

The bolt holes 51 are bored 2 places along the front and rear directions of the vehicle to be placed across the clip installation groove 53. In addition, in the clip installation groove 53, the entrance portion is narrower than the inner part in which the inserted resin clip 52 is located, and therefore, the resin clip 52 which is forcibly inserted from the lateral side can be held in the clip installation groove 53.

The right installation member constructed as disclosed above may be fastened beforehand to the body so as to project from the right side surface of the rear air conditioning unit, or may be installed afterward at an appropriate place on the right side surface of the rear air conditioning unit by bolting and the like.

Next, the function of the above-described structure for installation of the rear air conditioning unit along with the explanation concerning the installation method are explained below.

In this installation method, the temporary fastening of the left side of the rear air conditioning unit 1 to the vehicle is easily performed by insertion of the connecting hook 43 to the connecting hole 24. As a result, the load on the operator is lightened.

Furthermore, after the temporary fastening of the left side of the rear air conditioning unit 1 by insertion of the connecting hook 43 to the connecting hole 24, the temporary fastening of the right side of the rear air conditioning unit 1 can be performed by forcible insertion of the resin clip 52 to the temporary fastening hole 33. As a result, the operator can entirely free his hands from the rear air conditioning unit 1, and can begin the next operation, that is, the bolting of the left and right bracket fastening portions 42, 54 to the corresponding air conditioning fastening portions 23, 34, with both hands. Therefore, the operability of the installation is remarkably improved.

Figure 3A:
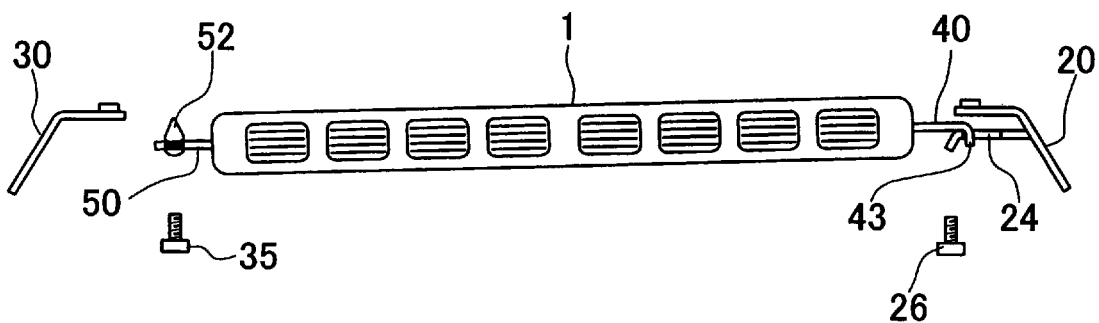
FIG. 3A is a explanatory drawing which shows a second step in the installation method of the air conditioning unit having the installation structure shown in FIG. 1.
Figure 3B:
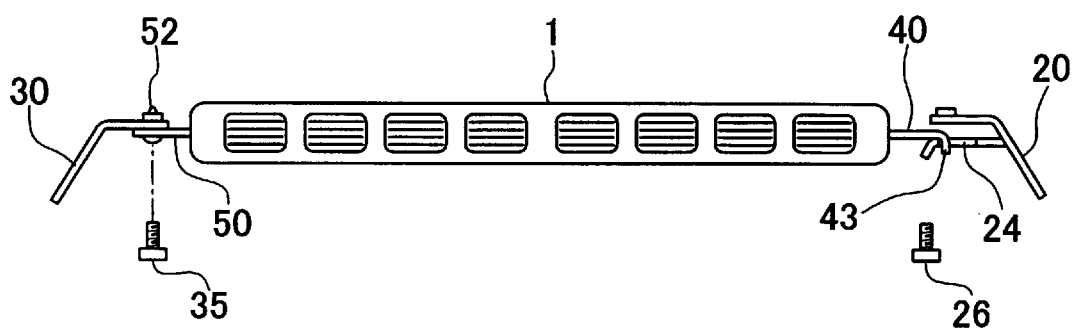
FIG. 3B is a explanatory drawing which shows a third step in the installation method of the air conditioning unit having the installation structure shown in FIG. 1.
Figure 3C:
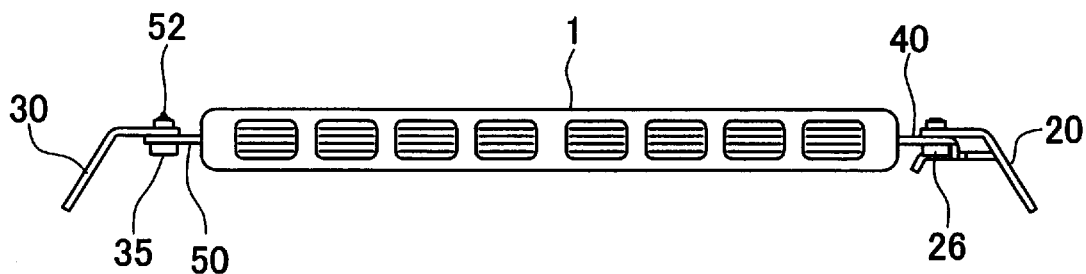
FIG. 3C is a explanatory drawing which shows a fourth step in the installation method of the air conditioning unit having the installation structure shown in FIG. 1.
Figure 4:
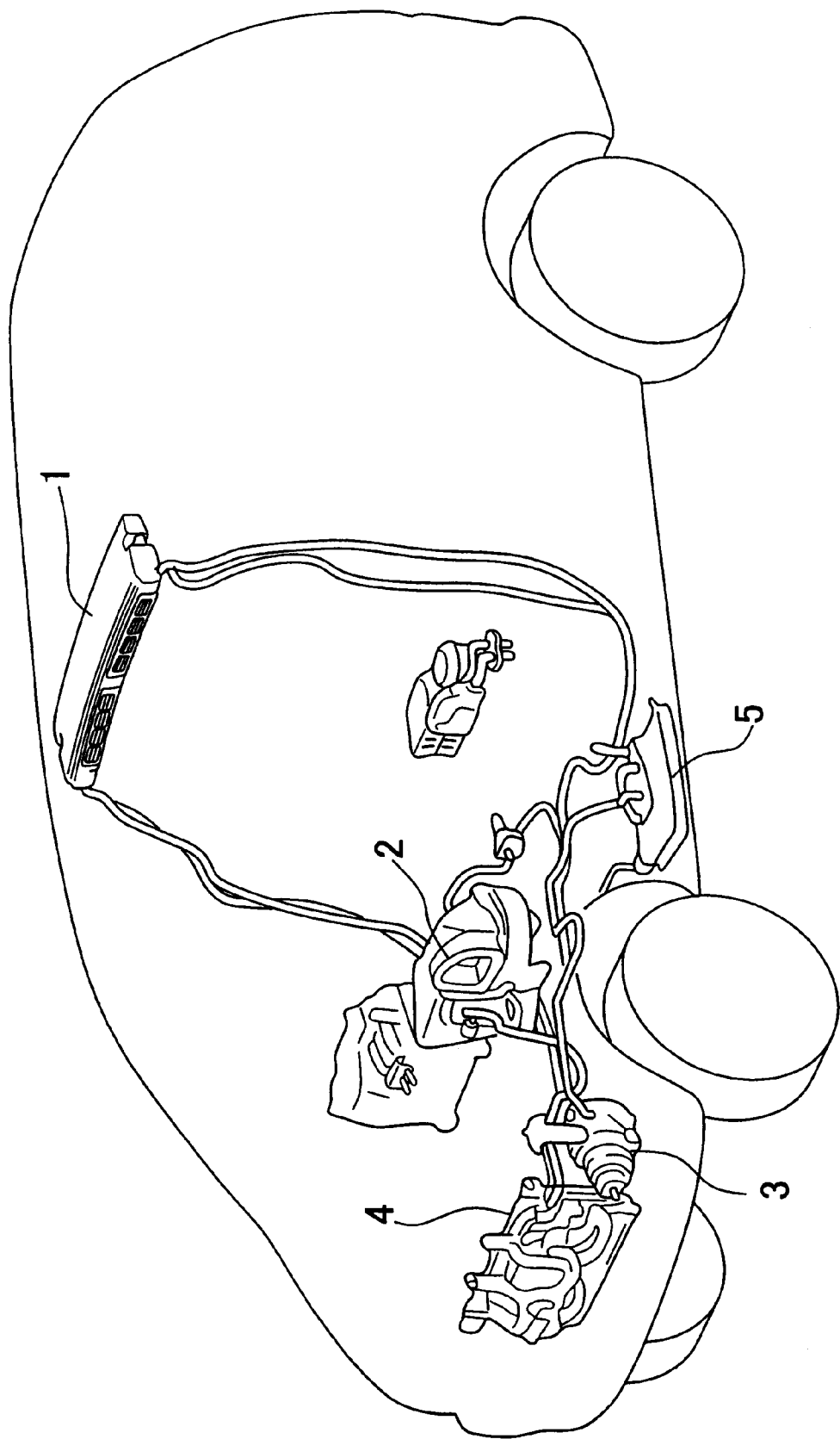
FIG. 4 is a perspective drawing to show the schematic structure of the air conditioning unit which is installed in the vehicle.
Figure 5:
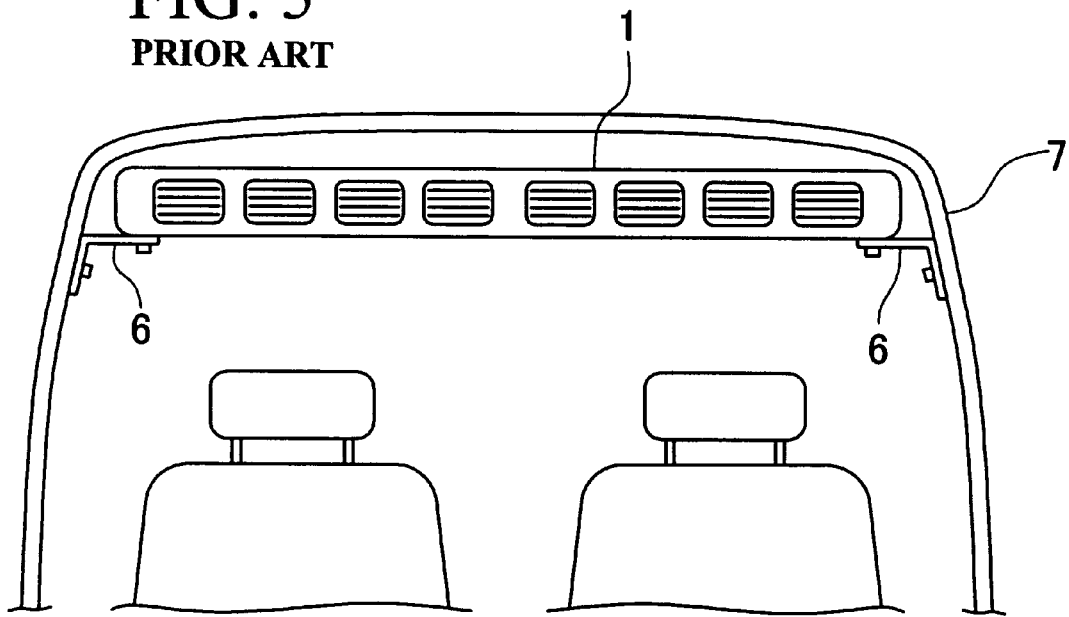
FIG. 5 is a drawing from the rear side of the vehicle to show the overhead-type air conditioning unit for a vehicle which is installed in the passenger compartment.
Figure 6:
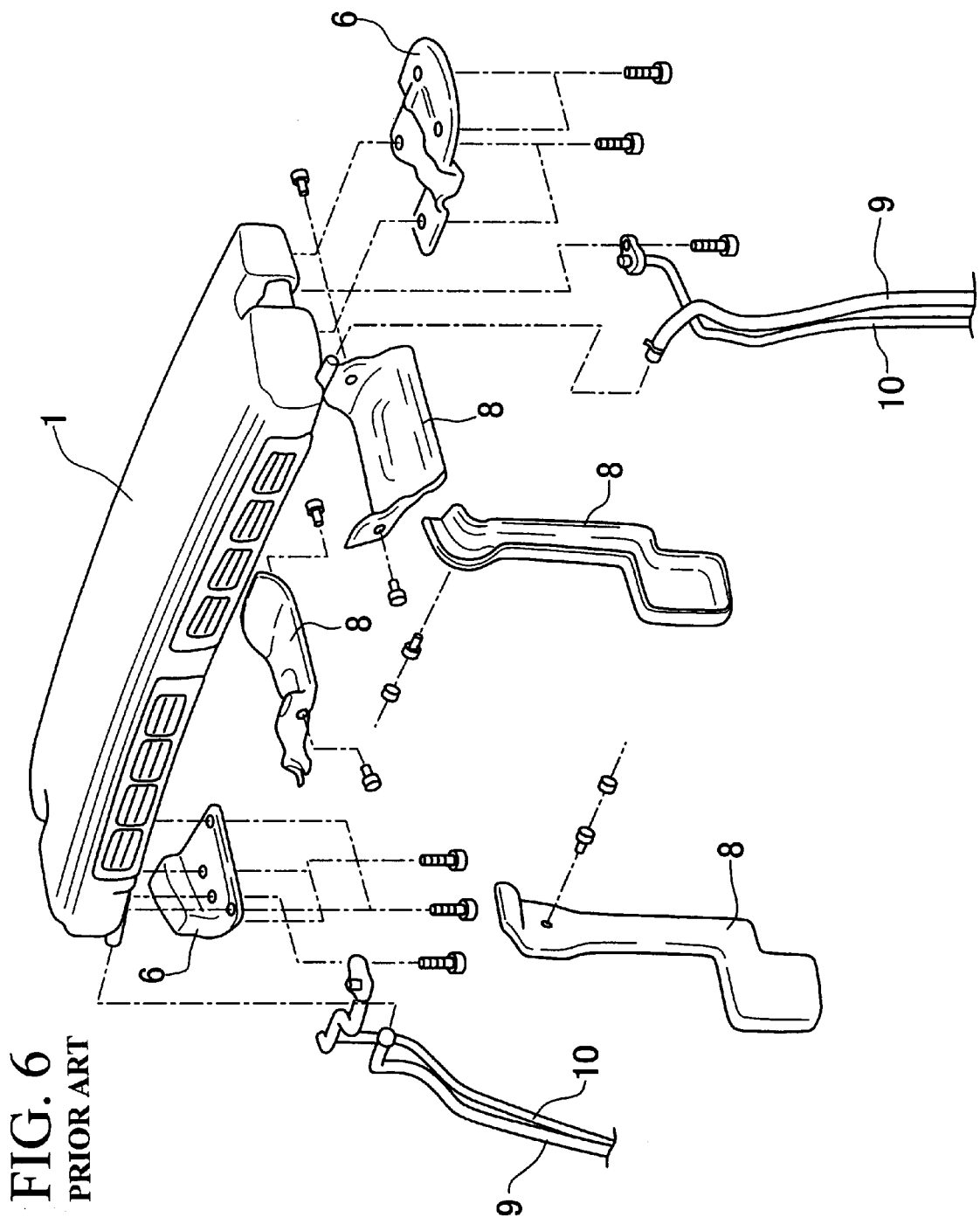
FIG. 6 is an exploded upper perspective drawing which shows the installation structure of the conventional air conditioning unit.
Figure 7:
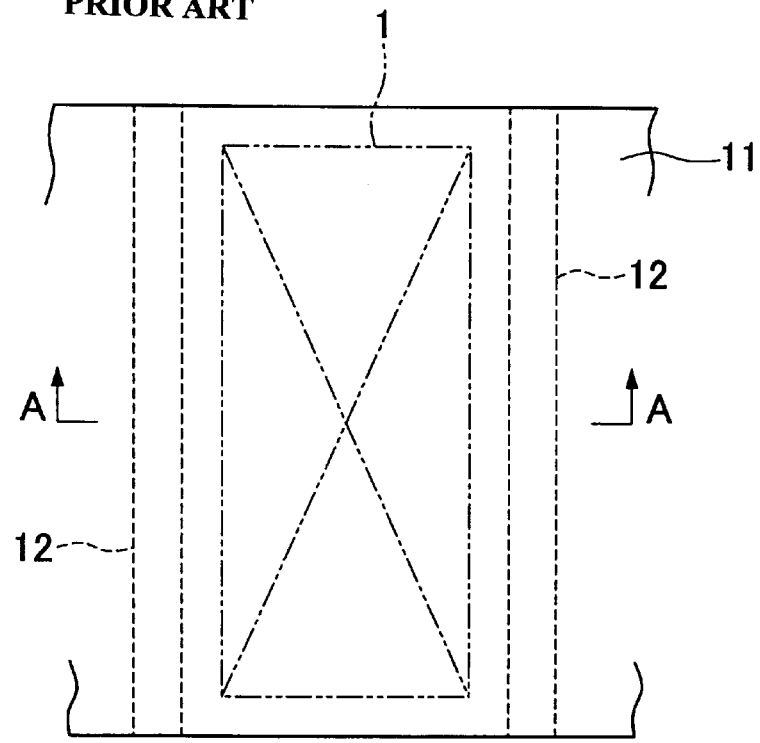
FIG. 7 is an enlarged plan view which shows the arrangement of the air conditioning unit for explanation of the conventional problem.
Figure 8:
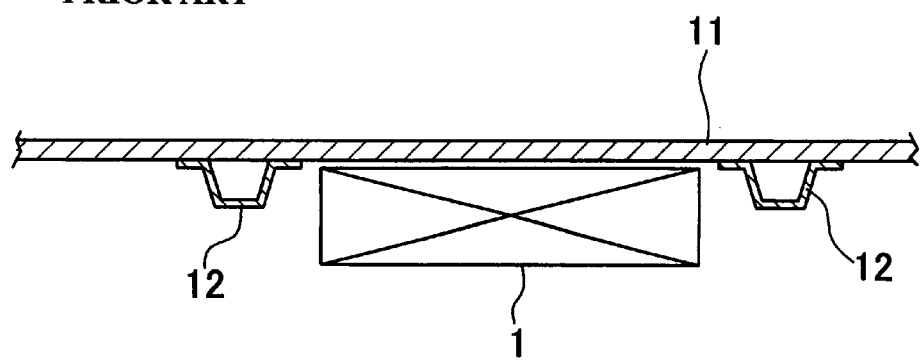
FIG. 8 is a cross sectional drawing of FIG. 7 along the line A—A.

Hereinafter, the installation method of the rear air conditioning unit 1 is concretely explained below with FIG. 3. In this installation structure, since the temporary fastening at both sides of the air conditioning unit can be performed by an easy operation, the operator can entirely free his hand from the air conditioning unit so as to begin the bolting operation FIG. 3.

In a first step, the left bracket 20 and the right bracket 30 are installed by fastening them to the predetermined positions of the body constructing members 7. In this step, the positions of the bolt holes 22, 23 are important for the installation of the rear air conditioning unit 1 to the predetermined positions.

In a second step, the operator carries the rear air conditioning unit 1 into the passenger compartment by himself, and performs the temporary fastening by lifting the unit between the reinforcement members 12 and by inserting the connecting hook 43 of the left insertion member 40 to the connecting hole 24 of the left bracket 20. In this operation, because the connecting hole 24 is sufficiently enlarged toward the connecting hook 43, the temporary fastening can be perform relatively easily, although the operator supports the rear air conditioning unit 1, which has long size and heavy weight, by himself. FIG. 3A shows the situation in which the temporary fastening of the rear air conditioning unit 1 has been finished by the connecting hook 43, and the left bracket 20 carries a part of the weight of the rear air conditioning unit 1 by the engagement of the connecting hook 43 and the connecting hole 24. Furthermore, because of this temporary fastening, the rear air conditioning unit 1 is held at one end and the further movement of this end is prevented. Therefore, the load of the operator is considerably decreased and the operation that uses at least one hand freely can be performed.

In the third step, the resin clip 52 of the right installation member 50 is forcibly inserted into the temporary fastening hole 33 of the right bracket 30 for the temporary fastening. In this case, because of the elastic deformation of the large diameter portion, the resin clip 52 passes through the temporary insertion hole 33 which has a relatively small diameter, and because of the release of the deformation, the resin clip 52 is held in the right bracket. Furthermore, the alignment between the resin clip 52 and the temporary insertion hole 33 can be easily performed since the connecting hook 43 in the connecting hole 24 can move along the longitudinal and width directions of the connecting hole 24 as described above.

Consequently, left and right ends of the rear air conditioning unit 1 are temporarily fastened and an operator is unnecessary for supporting the rear air conditioning unit 1, and therefore, both hands of the operator can be used freely.

In the last fourth step, positions of the bolt holes 51 of the right installation member 50 are adjusted to those of the bolt holes 32 of the right bracket 30, and positions of the bolt holes 42 of the left installation member 40 are adjusted to those of the bolt holes 22 of the left bracket 20. Furthermore, bolts 26, 35 are inserted therein and fastened. At this time, if the bracket has sufficient thickness, screw threads which engage with the bolts may be cut on the inner surface of the bolt holes, and if the bracket has insufficient thickness, nuts may be welded.

In addition, the temporary fastening of the right side which uses the resin clip 52 has less shifting and a higher positioning accuracy than the temporary fastening of the left side which uses the connecting hook 43. Therefore, any manufacturing error can be finally offset by the fastening operation at the oval shaped bolt holes 41. Moreover, the rear air conditioning unit 1 is fastened by bolting at 4 places which are located both sides of the resin clip 52 and the connecting hook 43, the rear air conditioning unit 1 can be stably fastened.

As explained above, in the structure and method for installation of the air conditioning unit according to the present invention, the unit can be easily lifted and installed by one person. Furthermore, since the interference between the unit and the reinforcement members at the sliding installation of the unit between the reinforcement members which was pointed out as the problem in the conventional unit can be prevented, the unit can be installed at a high position in the passenger compartment which is close to the roof panel. Therefore, a great advantage can be obtained for reducing the amount of the projection from the ceiling so as to provide a large and comfortable space in the passenger compartment, and a commercial value of the unit is increased.

In addition, since the temporary fastening of the unit can be easily performed in the restricted space of the passenger compartment, the unit can be sufficiently installed by one person and the load on the operator is lightened.

In the above explained embodiment of the present invention, the temporary fastening by the connecting hook 43 is performed at the left side and the temporary fastening by the resin clip 52 is performed at the right side, however, it is needless to say that the right and left can be changed. Furthermore, in the above explained embodiment, the low cost resin clip 52 is used as the elastic temporary fastening member; however, it is needless to say that other known elastic clips can be used.

What is claimed is:

1. An installation structure of an overhead-type air conditioning unit for a vehicle which is installed in the ceiling portion of a passenger compartment, comprising:

a bracket having a body fastening portion, an air conditioning unit fastening portion into which bolt holes are bored, and a temporary fastening portion into which a connecting hole is bored and located at the lower side of said air conditioning unit fastening portion via a predetermined space, in one body, and installed beforehand in a body constructing member;

and an installation member having a bracket fastening portion into which bolt holes are bored and a connecting hook which is downwardly provided at the point of said bracket fastening portion, and fastened on the side portion of said air conditioning unit;

wherein, said connecting hook is inserted into said connecting hole for temporary fastening, and after that, said bracket fastening portion is fastened to said air conditioning unit fastening portion by bolting.

2. An installation structure of an overhead-type air conditioning unit for a vehicle which is installed in the ceiling portion of a passenger compartment, comprising:

a first bracket having a body fastening portion, an air conditioning unit fastening portion which bolt holes are bored, and a temporary fastening portion into which a connecting hole is bored and located at the lower side of said air conditioning unit fastening portion via a predetermined space, in one body, and installed beforehand in one of a plurality of body constructing members which are located on the right and left of the ceiling portion;

a first installation member having a bracket fastening portion into which bolt holes are bored and a connecting hook which is downwardly provided at the point of said bracket fastening portion, and fastened on one side portion of said air conditioning unit;

a second bracket having a body fastening portion and an air conditioning unit fastening portion into which bolt holes and a temporary fastening hole are bored, and installed beforehand in the other of said body constructing members;

and a second installation member having a bracket fastening portion into which bolt holes are bored and an elastic temporary fastening member is upwardly projected, and fastened on the other side portion of said air conditioning unit;

wherein, said connecting hook is inserted into said connecting hole for temporary fastening at one side, and after that, said elastic temporary fastening member is forcibly inserted into said temporary fastening hole for temporary fastening, furthermore, both of said bracket fastening portions are fastened to both of said air conditioning unit fastening portions by bolting.

3. An installation structure of an overhead-type air conditioning unit for a vehicle according to claim 2, wherein the size of said connecting hole is determined to permit the movement of said connecting hook in said connecting hole along the longitudinal and width directions of said connecting hole.

4. An installation structure of an overhead-type air conditioning unit for a vehicle according to claim 2, wherein two oval holes extending along the width direction of the vehicle are bored to serve as said bolt holes at the front and rear side of said connecting hook of said first installation member.

5. An installation structure of an overhead-type air conditioning unit for a vehicle according to claim 3, wherein two oval holes extending along the width direction of the vehicle are bored to serve as said bolt holes at the front and rear side of said connecting hook of said first installation member.

6. An installation structure of an overhead-type air conditioning unit for a vehicle according to claim 2, wherein said elastic temporary fastening member is a resin clip.

7. An installation structure of an overhead-type air conditioning unit for a vehicle according to claim 3, wherein said elastic temporary fastening member is a resin clip.

8. An installation structure of an overhead-type air conditioning unit for a vehicle according to claim 4, wherein said elastic temporary fastening member is a resin clip.

9. An installation structure of an overhead-type air conditioning unit for a vehicle according to claim 5, wherein said elastic temporary fastening member is a resin clip.

10. An installation method of an overhead-type air conditioning unit for a vehicle which is installed in the ceiling portion of a passenger compartment, comprising:

a first step of installing a first bracket having a body fastening portion, an air conditioning unit fastening portion into which bolt holes are bored, and a temporary fastening portion into which a connecting hole is bored and located at the lower side of said air conditioning unit fastening portion via a predetermined space, in one body, and a second bracket having a body fastening portion and an air conditioning unit fastening portion into which bolt holes and a temporary fastening hole are bored, in body constructing members which are located on the right and left respectively;

a second step of inserting a connecting hook downwardly provided at the point of a bracket fastening portion into which bolt holes are bored and formed at a first installation member fastened on one side portion of said air conditioning unit, into said connecting hole of said first bracket for temporary fastening;

a third step of forcibly inserting an elastic temporary fastening member upwardly projected from a bracket fastening portion into which bolt holes are bored and formed at a second installation member fastened on the other side portion of said air conditioning unit, into said temporary fastening hole of said second bracket for temporary fastening;

and a fourth step of fastening said bracket fastening portions of said first and second installation member toward said air conditioning unit fastening portions of said first and second brackets by bolting.

\* \* \* \* \*